Nov. 24, 1959    E. S. McLEAN ET AL    2,914,084
FLUID FLOW CONTROL DEVICE
Filed Nov. 21, 1957
FIG. 1.
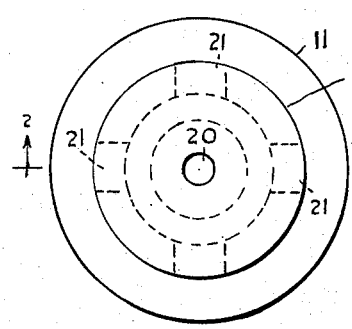
FIG. 4.
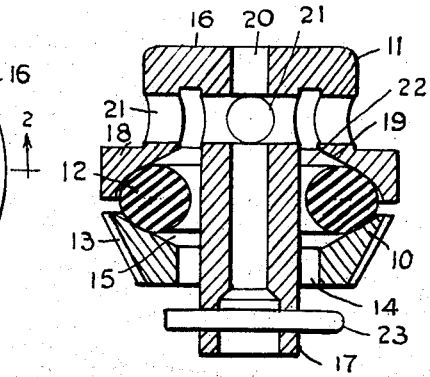
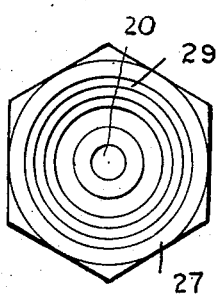
FIG. 6.
FIG. 2.
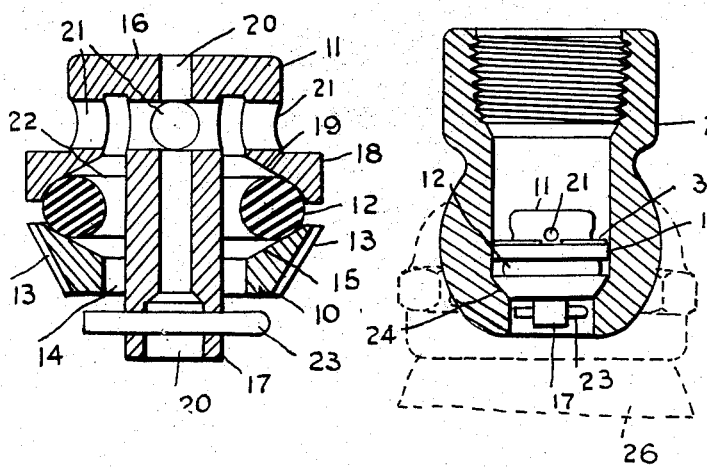
FIG. 3.
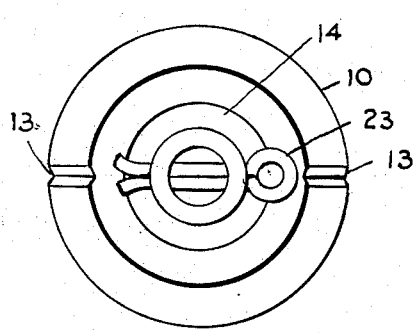
FIG. 5.
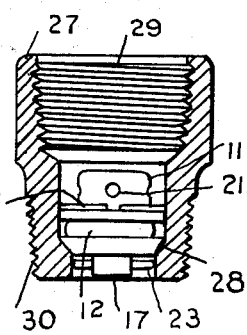
FIG. 7.
INVENTORS,
JAMES FRASER
& EDWARD S. McLEAN
BY Holcombe, Wetherill & Brunton
ATTORNEYS 2,914,084
Patented Nov. 24, 1959

2,914,084
FLUID FLOW CONTROL DEVICE

Edward S. McLean and James Fraser, Wilmington, Del., assignors to Speakman Company, Wilmington, Del.

Application November 21, 1957, Serial No. 697,939

3 Claims. (Cl. 137—504)

The present invention relates to a device for controlling the flow of water through a conduit.

It is an object of the present invention to provide a device that will control the flow of water through a conduit so as to regulate the volume delivered independently of the pressure in the conduit.

Another object of the invention is to provide a device that will deliver a constant flow of fluid regardless of the pressure, having two fluid passages therein, one passage being controlled in accordance with the pressure and the other passage being independent of any control means.

A still further object of this invention is to provide a conduit so arranged that the fluid flowing therethrough has impinging streams to limit the sound usually produced by a single fluid stream.

More specifically the object of the invention is to provide a volume control means that will deliver a constant volume of fluid under a plurality of pressures. The various features of novelty which characterize the invention are pointed out with particularity in the claims annexed to and forming part of this invention.

For a better understanding of the invention, however, and its advantages and specific objects obtained by its use, reference is made to the accompanying drawings and descriptive matter in which is illustrated and described and preferred embodiment of the invention.

In the drawings:

Figure 1 is a top plan view of the flow control device.

Fig. 2 is a section on line 2—2 of Fig. 1.

Fig. 3 is a bottom plan view of the flow control device.

Fig. 4 is a section on line 2—2 of Fig. 1 showing the flow under pressure.

Fig. 5 is a view, partially in section showing the device mounted in a shower head.

Fig. 6 is a plan view of the device shown in Fig. 5.

Fig. 7 is a view partially in section showing the flow control device mounted in a conduit.

The flow control device comprises two portions, a body portion 10 and a plunger portion 11. Between the body portion 10 and the plunger portion 11 is a solid elastic O-ring 12 shown in Figs. 2 and 4.

The body portion 10 has an outer surface machined to fit within a conduit and has the grooves 13, 13 shown in Figs. 2 and 3 on its outer surface. These shallow grooves 13 in the tapered edges are to allow a small leak to prevent the ring 10 from being lifted off the bevelled seat by sand or some other foreign substance. The body portion has a central opening 14 shown in Figs. 2, 3 and 4, which opening receives the stem portion of the plunger and at the same time forms a conduit for the flow of fluid through the body portion. The inner surface 15 of the body portion slopes towards the center thereof and retains the elastic O-ring 12 on this surface. When the elastic O-ring is compressed the angle of slope of the surface controls the deformity of the O-ring to constrict its inner periphery and thereby control the fluid flow through the ring.

The plunger portion 11 comprises an upper portion 16 having a stem portion 17 made integral therewith and a depending outer ring portion 18 also made integral therewith. The outer ring portion has a sloping inner surface 19 that contacts the O-ring 12 supplementing the surface 15 on the body portion. The conduit 20 opening on the top of the upper portion allows the flow of fluid through the stem portion 17 and out the lower end of the stem in an uncontrolled manner. The four conduits 21, shown in Figs. 1 and 2, allow the flow of water through the sides of the upper portion 16. These conduits have two openings therein, one allowing the flow of fluid through the chamber 22 and out the central opening 14. The other allows the flow of fluid through the central conduit 20 and out the opening at the lower end thereof. That portion of the fluid flowing through the conduit 21 that is admitted to the conduit 20 enters the conduit 20 at right angles to the flow of fluid therethrough and flows through the device in an uncontrolled stream. That portion of the water flowing through the conduit 21 that is admitted to the chamber 22 flows through the opening 14 and is controlled in volume by the position of the O-ring 12. This ring expands with increase in pressure, due to the movement of the plunger unit 11 downwardly, with increased pressure thereby expanding the deformable O-ring 12 inwardly to restrict the flow of fluid through the chamber 22 as the O-ring approaches the stem portion 17 of the plunger member 11, as shown in Fig. 4. The plunger member 11 is held in position by means of an expandable cotter pin 23, shown in Figs. 2, 3 and 4. The angle of the surfaces 15 and 19 control the displacement of the O-ring and thereby control the opening in chamber 22 at a given pressure. The steeper the angle the less fluid will pass therethrough.

The O-ring 12 shown in Figs. 2 and 4 is made of a deformable material and is forced inwardly to close the central opening between the stem 17 and the inner surface of the O-ring as shown in Fig. 4. This restricts the flow of water through this ring and thereby controls the volume in proportion to the pressure exerted on the plunger portion 11. The O-ring is retained between the diverging surfaces 15 and 19 which are forced together with increased pressure due to the downward movement of the plunger unit 11. The ring is displaced inwardly from the position shown in Fig. 2 to the position shown in Fig. 4.

While the O-ring disclosed in the preferred embodiment of this invention is round in cross section, a ring other than round cross section could be used. Such a ring could be oval or flat as long as it would be deformed inwardly by the converging surfaces shown in Figs. 2 and 4 with increased pressure, and this invention should not be limited to the O-ring shown, as it is only used for illustration.

The flow control device is removable as shown in Figs. 2 and 4 and may be inserted in a conduit having a shoulder 24 in the bottom portion of the conduit to receive the outer surface of the body portion 10. The shallow grooves 13 in the tapered edges are to allow a small leak to prevent the ring 10 from being lifted off the bevelled seat by sand or some other foreign substance. This unit is held in place by means of the split ring 31 shown in Figs. 5 and 7. Such a mounting of the device in a conduit 25 connected with a shower head 26 is shown in Fig. 5. The device may also be mounted in an ordinary fluid conduit and is shown in Fig. 7 inserted within a nipple 27 having a shoulder 28 to receive the body member 10. This nipple 27 has a female threaded portion at the top thereof and a male threaded portion at the bottom thereof to facilitate connection into a fluid conduit.

While the best form and preferred embodiment of the invention has been illustrated and described as required by law it will be apparent to those skilled in the art that it may be applied to other systems of distributing fluid and that changes may be made in the form of the apparatus to suit special conditions within the scope of this invention as set forth in the appended claims.

What is claimed is:

1. A fluid conduit having a shoulder therein, a fluid flow valve for maintaining a substantially constant flow of fluid under variable pressure conditions, comprising a stationary circular body member retained on said shoulder in said conduit having an axial fluid passage therethrough and having a frusto-conical inner surface on said member extending from one end thereof and intersecting said through passage, an O-ring on said body member, retained against the frusto-conical surface, a movable plunger member having an outer portion and a central portion with an annular passage therebetween, said central portion extending through said O-ring, an outwardly sloping frusto-conical surface extending from one end of said outer portion to form an outwardly flared end portion of said passage, so as to direct flow between the O-ring and said central portion, said central portion having a fluid conduit extending therethrough.

2. A fluid conduit having a shoulder therein, a fluid flow valve for maintaining a substantially constant flow of fluid under variable pressure conditions, comprising a stationary circular body member retained on said shoulder in said conduit having an axial fluid passage therethrough and having a frusto-conical inner surface on said member extending from one end thereof and intersecting said through passage, a deformable member having a central fluid passage therethrough, retained against the frusto-conical surface, a movable plunger member having an outer portion and a central portion with an annular passage therebetween, said central portion extending through said deformable member, an outwardly sloping frusto-conical surface extending from the lower end of said outer portion to form an outwardly flared end portion of said passage so as to direct flow between the deformable member and said central portion which has a fluid conduit extending therethrough.

3. A fluid conduit having a shoulder therein, a fluid flow valve for maintaining a substantially constant flow of fluid under variable pressure conditions, comprising a stationary circular body member retained on said shoulder in said conduit having an axial fluid passage therethrough and having a frusto-conical inner surface on said member extending from one end thereof and intersecting said through passage, a deformable member having a central fluid passage therethrough, retained against the frusto-conical surface, a movable plunger member having an outer portion and a central portion with an annular passage therebetween, said central portion extending through said deformable member, an outwardly sloping frusto-conical surface extending from the lower end of said outer portion to form an outwardly flared end portion of said passage so as to direct flow between the deformable member and said central portion.

References Cited in the file of this patent
UNITED STATES PATENTS

| | | |
|---|---|---|
| 1,079,985 | Kaminsky | Dec. 2, 1913 |
| 2,289,905 | Dasher | July 14, 1942 |
| 2,813,541 | Beller | Nov. 19, 1957 |